United States Patent
Schwartz et al.

(10) Patent No.: US 6,752,970 B2
(45) Date of Patent: Jun. 22, 2004

(54) AIR TREATMENT APPARATUS AND METHODS

(75) Inventors: Harold O. Schwartz, Sturgeon Bay, WI (US); Rick B. Hill, Allen, TX (US); Ronald G. Fink, Jupiter, FL (US)

(73) Assignee: Shaklee Corporation, Pleasanton, CA (US)

( * ) Notice: Subject to any disclaimer, the term of this patent is extended or adjusted under 35 U.S.C. 154(b) by 143 days.

(21) Appl. No.: 09/930,123

(22) Filed: Aug. 14, 2001

(65) Prior Publication Data

US 2003/0077211 A1 Apr. 24, 2003

(51) Int. Cl.$^7$ ................................................. B01J 19/08
(52) U.S. Cl. ............................. 422/186.3; 422/186.04; 422/121
(58) Field of Search ......................... 422/186.3, 186.06, 422/121

(56) References Cited

U.S. PATENT DOCUMENTS

| | | |
|---|---|---|
| 3,581,462 A | 6/1971 | Stump |
| 3,753,651 A | 8/1973 | Boucher |
| 3,873,835 A | 3/1975 | Ignatjev |
| 4,037,268 A | 7/1977 | Gallagher |
| 4,096,544 A | 6/1978 | Ignatjev |
| 4,109,290 A | 8/1978 | Gallagher |
| 4,253,852 A | 3/1981 | Adams |
| 4,344,776 A | 8/1982 | Yavnieli |
| 4,376,642 A | 3/1983 | Verity |
| 4,391,773 A | 7/1983 | Flanagan |
| 4,672,504 A | 6/1987 | Stone |
| 4,672,509 A | 6/1987 | Speraw |
| 4,743,275 A | 5/1988 | Flanagan |
| 4,857,277 A | 8/1989 | Broomfield |
| 4,918,568 A | 4/1990 | Stone et al. |
| 5,005,101 A | 4/1991 | Gallagher et al. |
| 5,012,159 A | 4/1991 | Török et al. |
| 5,065,272 A | 11/1991 | Owen et al. |
| 5,136,461 A | 8/1992 | Zellweger |
| 5,326,539 A | 7/1994 | Taylor |
| 5,397,552 A | 3/1995 | Weigold et al. |
| 5,538,692 A | 7/1996 | Joannou |
| 5,632,852 A | 5/1997 | Ivansons et al. |
| 5,656,063 A | 8/1997 | Hsu |
| 5,656,242 A | 8/1997 | Morrow et al. |
| 5,707,594 A * | 1/1998 | Austin ..................... 422/186.3 |
| 5,759,487 A | 6/1998 | Jung |
| 5,835,840 A | 11/1998 | Goswami |
| 6,002,573 A | 12/1999 | Partridge |
| 6,093,676 A | 7/2000 | Heller et al. |
| 6,117,337 A | 9/2000 | Gonzalez-Martin et al. |
| 6,118,645 A | 9/2000 | Partridge |
| 6,126,722 A | 10/2000 | Mitchell et al. |
| 6,248,235 B1 | 6/2001 | Scott |
| 6,464,868 B1 * | 10/2002 | Korin ....................... 422/186.3 |
| 6,508,982 B1 * | 1/2003 | Shoji .......................... 422/121 |

OTHER PUBLICATIONS

Specification for Pure Air 2500, no date available.
U.S. patent application No. 09/614,648, filed Jul. 12, 2000.

* cited by examiner

*Primary Examiner*—Kishor Mayekar
(74) *Attorney, Agent, or Firm*—Klarquist Sparkman, LLP (57) ABSTRACT

A multi-function air treatment apparatus includes a photo-ionizing assembly and a negative ion generator. The photo-ionizing assembly emits a predetermined wavelength of light that produces ozone when it impinges upon air. When a portion of the light impinges on a target material, radicals and ions that bond with and reduce some of volatile organic compounds in the air are produced. The negative ion generator produces negative ions and a radiating negative electrostatic field from an outer high dielectric surface by an electrical charge applied to an enclosed conductive inner surface.

22 Claims, 5 Drawing Sheets

AIR TREATMENT APPARATUS AND METHODS

BACKGROUND

This invention relates to a new air treatment apparatus and methods for treatment of air.

Air treatment, i.e., the process of treating air to remove undesirable materials, is of great interest as advances in research continue to suggest that breathing purer air has tangible health benefits.

One known type of air treatment, referred to as air ionization or electron generation, involves using a source of electricity to produce a charge and generate negative ions. Contaminants suspended in air, such as dust, smoke and pollen, are usually made up of small positively-charged particles. The earth, buildings and other large objects are also positively charged, and thus tend to repel these particles, which keeps them in suspension. Negative ions are beneficial because they combine with the positive particles and neutralize them, and the resulting combinations fall to the earth or floor under the action of gravity because they are heavier than air. As a result, the "ionized" air has fewer suspended particles.

Most conventional air ionizers use corona discharge to produce a charge on a surface to generate negative ions. Corona discharge devices involve high voltages and may have a high capacitance, so the user's inadvertent contact with a charged collector surface may lead to an undesirable shock.

Another known type of air treatment called photo-ionization involves producing ozone by subjecting the oxygen in air to ultraviolet light at a known wavelength (about 185 nm). Ozone is an effective oxidizer of organic substances, including bacteria, algae, mildew and mold, and helps to eliminate odor.

It would be desirable to provide an apparatus that would allow for treatment of air by negative ionization and photo-ionization in a single unit. It would also be desirable to provide for treatment of volatile organic compounds (VOCs), which are not generally susceptible to ozone oxidation.

DETAILED DESCRIPTION

In a new air treatment unit, ambient air, such as air within a living space, is treated to make it more healthy to breathe.

According to one aspect of the new air treatment unit, a negative ion generation unit that creates negative ions is provided together with a photo-ionizer. The negative ion generator has an exposed outer surface that is a high dielectric, i.e., substantially nonconductive, and an enclosed inner conductive surface that becomes charged. Negative ions generated at the outer surface are transferred to air via a negative electrostatic field.

In specific implementations, a power supply that supplies power to the negative electron generator overcomes the bound charges and is self-limiting.

The photo-ionizer or photo-ionizing assembly has a light source that emits ultraviolet light. When oxygen in air is subjected to the ultraviolet light, the oxygen forms ozone.

According to another aspect, some of the ultraviolet light produced by light source is caused to strike a target material. The target material includes a catalyst that causes peroxide radicals and super-oxide ions to be produced. The peroxide radicals and super-oxide ions react with VOCs in air and reduce them. Also, because this portion of the ultraviolet light is used to form peroxide radicals and super-oxide ions, and not to produce ozone, the overall production of ozone, which can be an irritant in high quantities, is regulated.

General

Figures 1, 2:
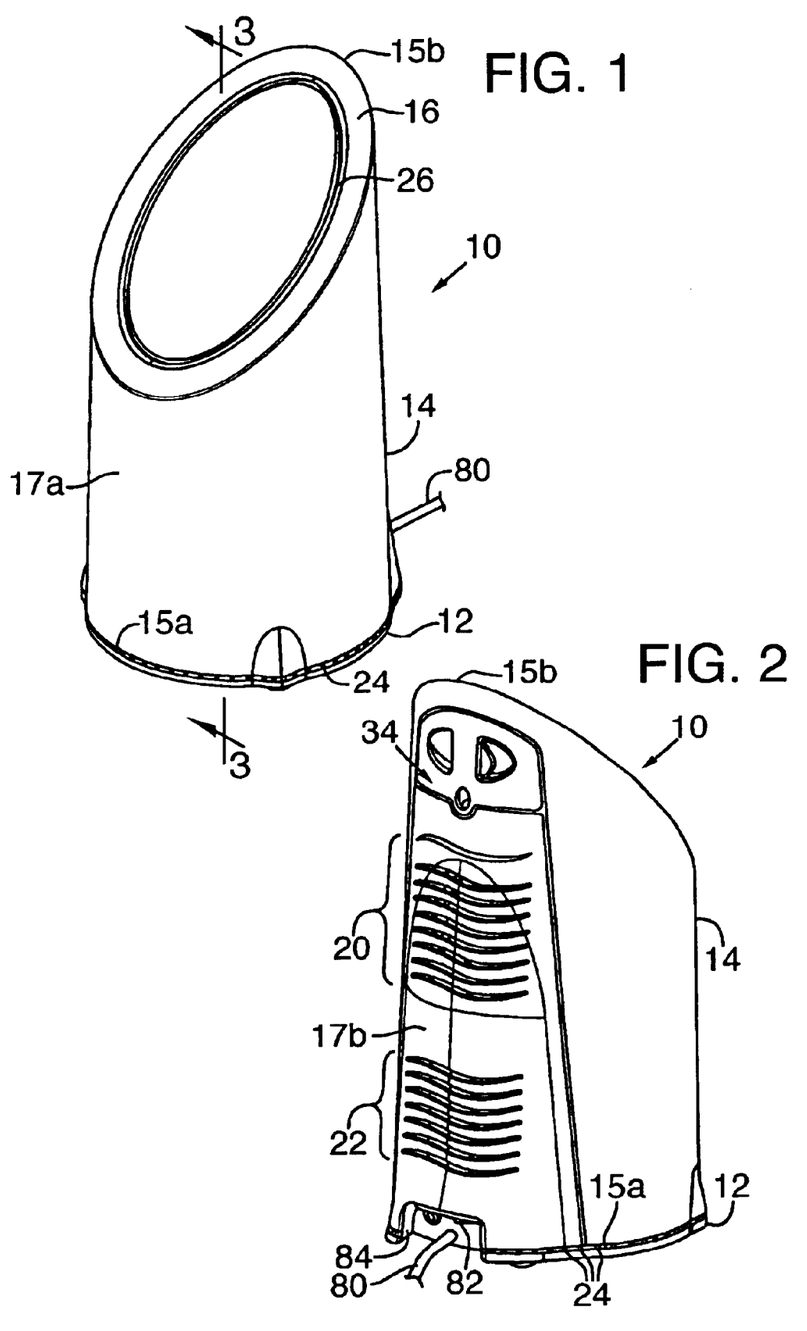
FIGS. 1 and 2 are front and rear perspective views, respectively, of one implementation of a new air treatment unit.

As shown for one implementation in FIG. 1, an air treatment unit 10 has a base 12 and a generally frustoconical housing 14 extending upwards from the base 12. The housing 14 tapers in diameter from its lower end 15a adjacent the base 12 to an upper end 15b at the top surface 16. The top surface 16 slopes upwardly from a front side 17a, which is shown in FIG. 1, to a rear side 17b, which is shown in FIG. 2.

Figure 3:
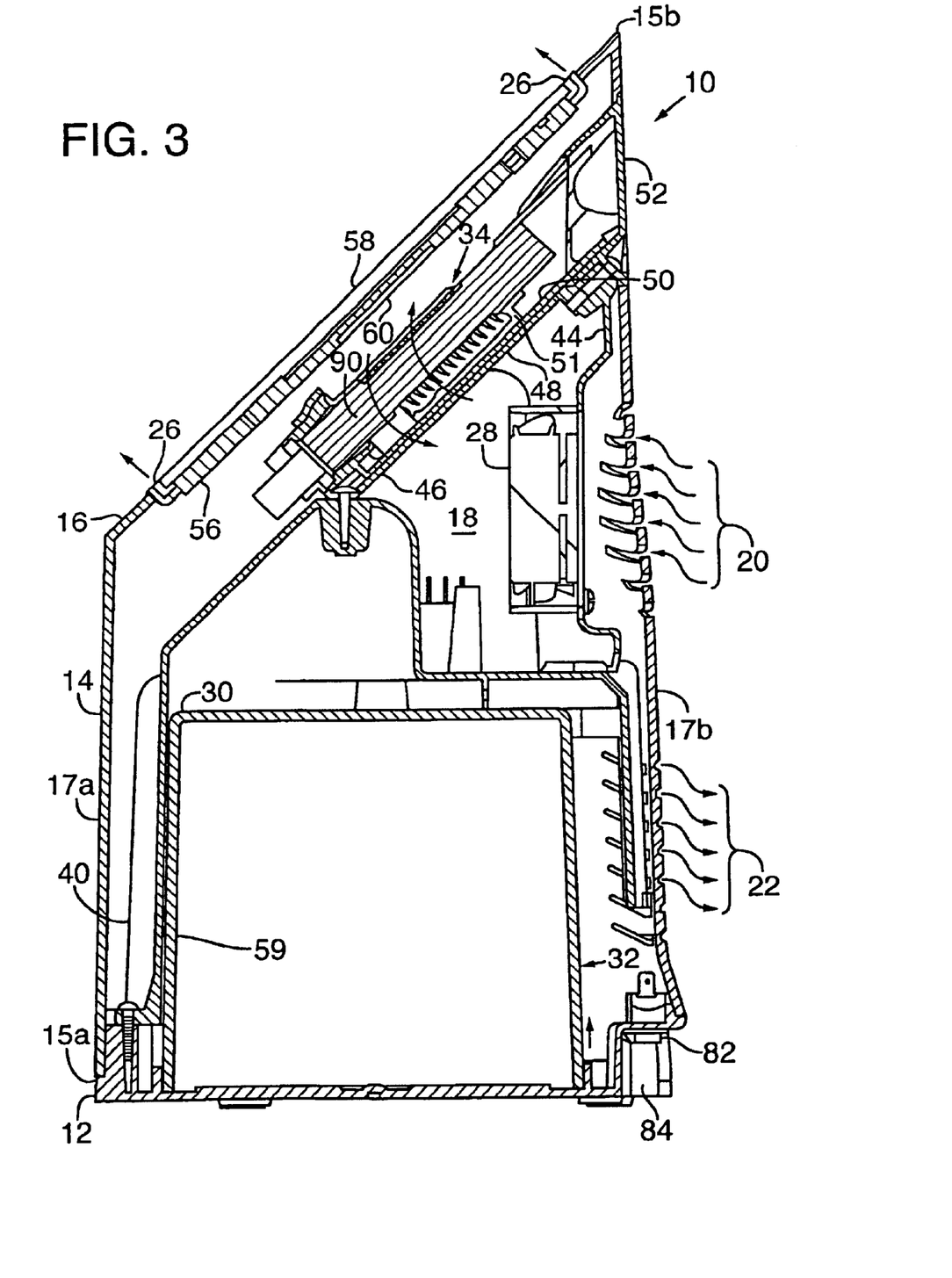
FIG. 3 is a sectional view in elevation of the air treatment unit of FIG. 1, viewed along a line at arrows 3—3 in FIG. 1.

Referring to the cross-section of the air treatment unit 10 shown in FIG. 3, the assembled base 12 and housing 14 define a generally enclosed interior 18. Air enters the interior, circulates therein and eventually exits as shown by the arrows. The rear side 17b has louver openings formed therein that are arranged in an upper air inlet portion 20 and a lower air outlet portion 22. Openings 24 (FIGS. 1 and 2) between the base 12 and the lower end 15a of the housing 14, as well as a gap 26 (FIGS. 1 and 3) in the top surface 16, also serve as additional air outlet openings.

A fan 28 is positioned within the interior 18 adjacent the air inlet portion 20 to draw air into and generate an air flow through the housing 14. Air within the housing flows upwardly and around a photo-ionization assembly 34. Ultraviolet light from the photo-ionization assembly 34 causes oxygen in the air to form ozone.

In operation, which is described below in greater detail, a substantial portion of any given volume of air flowing through the housing 14 is treated by (1) neutralizing positively charged particles through their interaction with the negative ions (which also occurs in surrounding air outside the housing) and (2) oxidation (through the production of ozone by photo-ionization). Optionally, photo-ionization may also include the production of certain radicals and ions (through ultraviolet light striking a target) that reduce VOCs, as is also described below.

Construction

Figure 5:
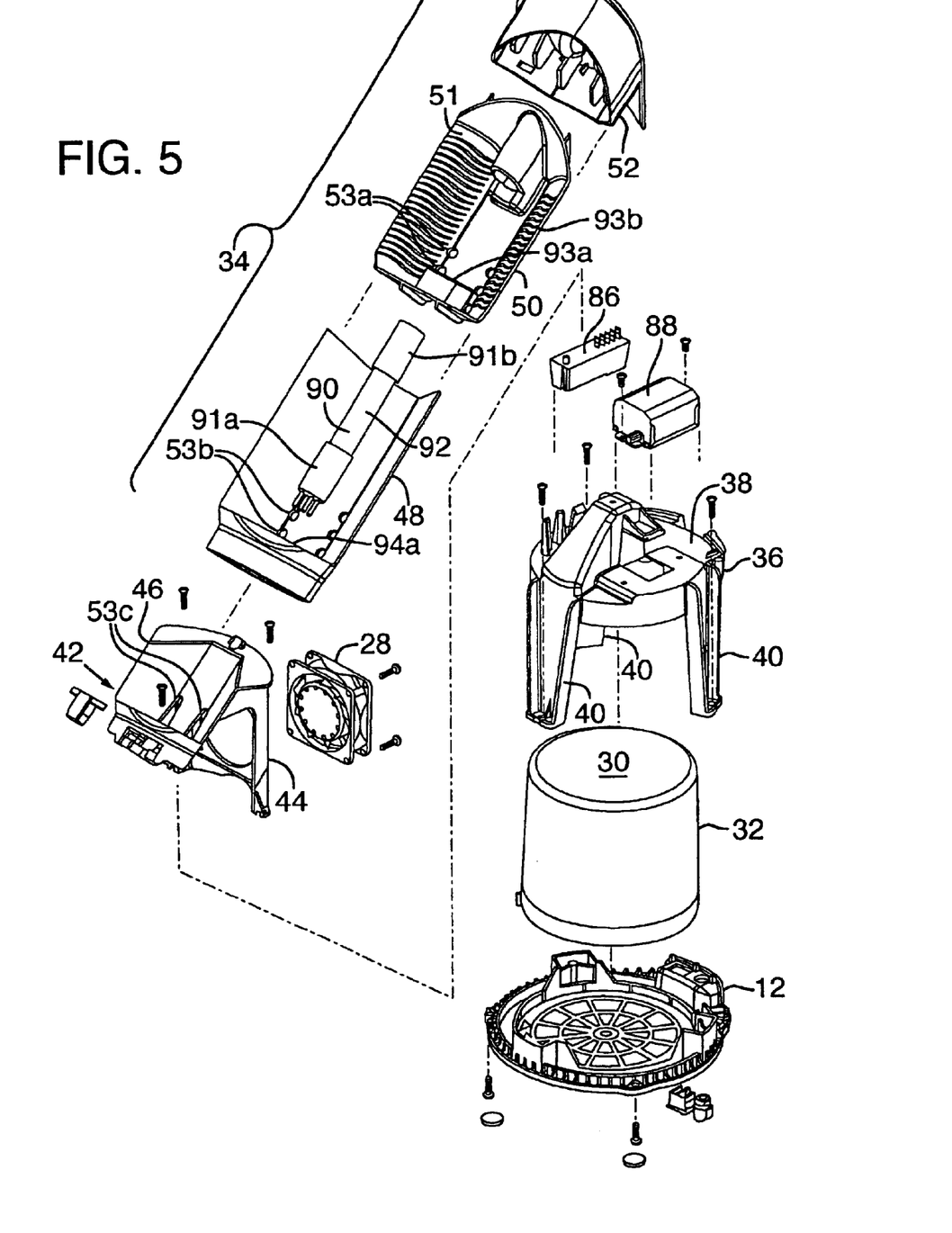
FIG. 5 is an exploded assembly view of components within the housing of the air treatment unit of FIG. 1.

FIG. 5 is an exploded assembly view showing the base 12 and the components within the housing 14.

The negative ion generator 32 is a hollow, generally cylindrical structure that tapers slightly from its open lower end to its closed upper end. The lower end is received within the base 12. An upper surface of the base 12 and an inner surface 59 of the negative ion generator 32 together define a chamber therein. The negative ion generator 32 is formed of a high dielectric material, such as melamine, and the outer surface 30 is therefore substantially non-conductive. The inner surface 59 is made to be conductive, e.g., as through application of a coating of graphite.

A mounting member 36 has a mounting plate 38 positioned above the negative ion generator 32 (FIG. 3) and spaced apart legs 40 that are attached to the base 12 with fasteners. In the assembled unit 10, the legs 40 are positioned adjacent but slightly spaced from the outer surface 30 of the negative ion generator 32 as shown in FIG. 3 to allow air circulation.

A support member 42 is attached at a rear side of the mounting plate 38, e.g., with fasteners. The fan 28 is coupled to an upright portion 44 of the support member 42 with fasteners. An angled portion 46, which is cantilevered from the upright portion 44, provides a support for the photo-ionization assembly 34.

The photo-ionizing assembly 34 includes a tray (having an outer tray 48, an inner tray 50 nested within the outer tray 48 and a tray end 52) and a fluorescent bulb 90. Apertures 53a, 53b and 53c in the inner tray 50, outer tray 48 and angled portion 46, respectively, provide for increased air flow into and around the ionization assembly 34. An electrical connection, e.g., a socket (not shown), for the bulb 90 is provided on the angled portion 46 adjacent a lower end of the tray.

The fluorescent bulb 90, which produces ultraviolet light, typically has two ceramic ends 91a, 91b and a substantially cylindrical transparent lighting surface 92 between the two ends 91a, 91b. The end 91a has electrical terminals for establishing an electrical connection.

When assembled, the ends 91a, 91b of the bulb 90 are received within openings 93a, 93b in the inner tray 50, respectively, with the end 91a also extending through an opening 94a in the outer tray 48. When assembled, the lighting surface 92 of the bulb 90 is spaced from the inner tray 50.

Optionally, an inner surface 51 of the inner tray 50 may be provided with a target material. In a specific implementation, the target material is provided as a coating on the inner surface 51, and the coating is applied to substantially all of the inner surface 51. If the inner tray includes an optional coil 95 as shown in FIGS. 7A, 7B and 7C or a similar mesh or screen-like structure, the coil 95 or the structure may also be provided with the target material.

Figures 6, 7A, 7B:
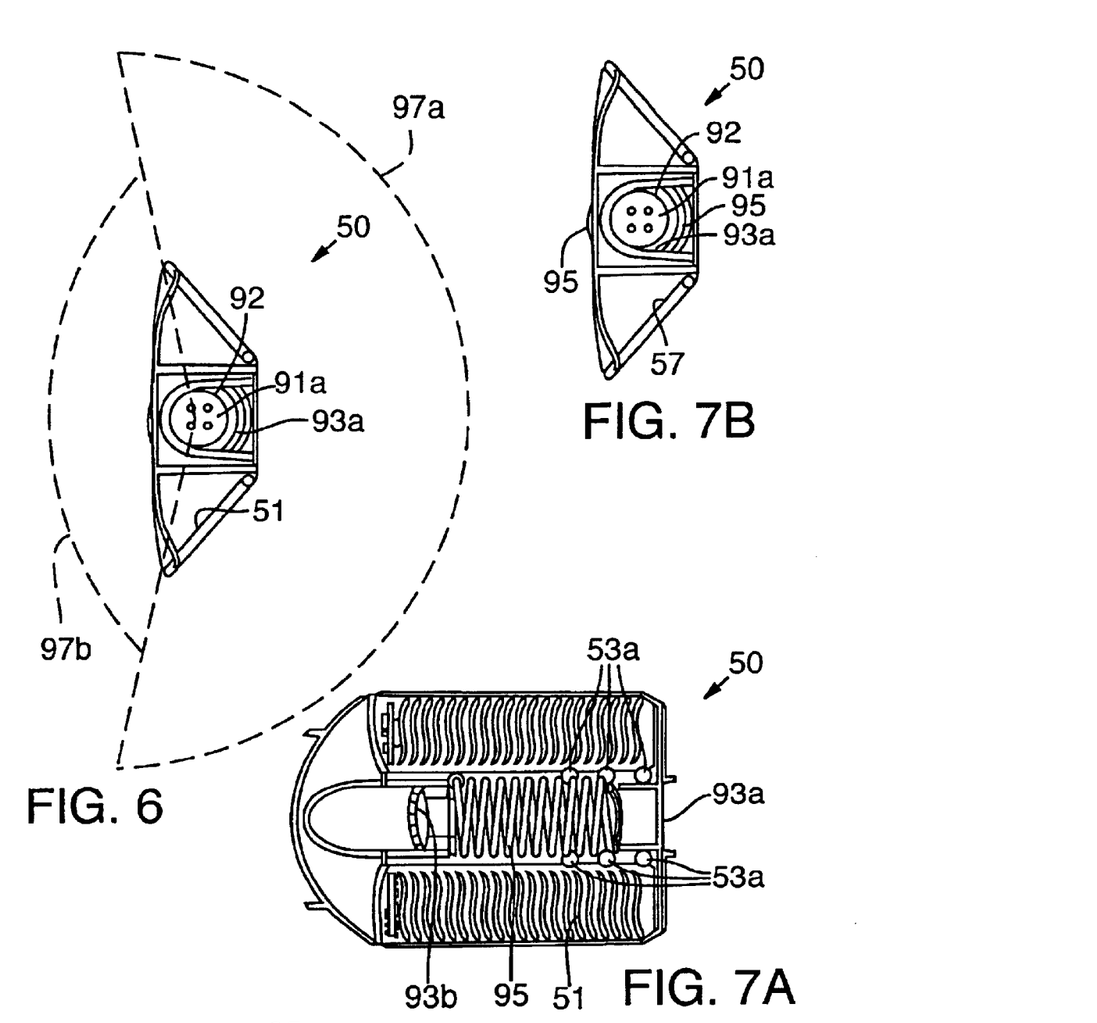
FIG. 6 is a view of a lower end of an inner tray shown in FIG. 5 assembled with a bulb.
FIG. 7A is a top view of a modified tray.
FIG. 7B is a slightly enlarged end view showing a bulb within the modified tray.
Figure 7C:
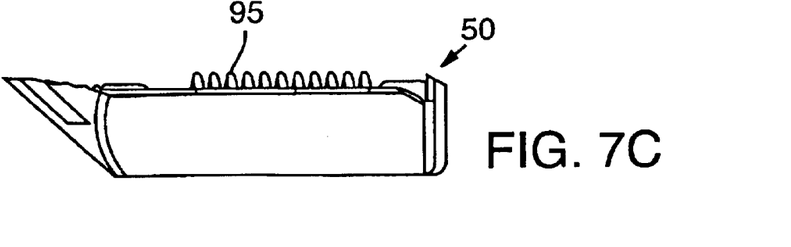
FIG. 7C is a slightly enlarged side view of the modified tray.

FIGS. 7A, 7B and 7C show an implementation of the inner tray 50 is with the optional coil 95 extending between the openings 93a, 93b. The coil 95 is configured of a series of spaced rings each having an opening sized to receive the installed bulb 90, yet remain spaced from the lighting surface 92. FIG. 7B shows the end 91a received within the opening 93a and the coil 95 radially spaced from the lighting surface 92. Further details regarding the coating are described below.

Figure 4:
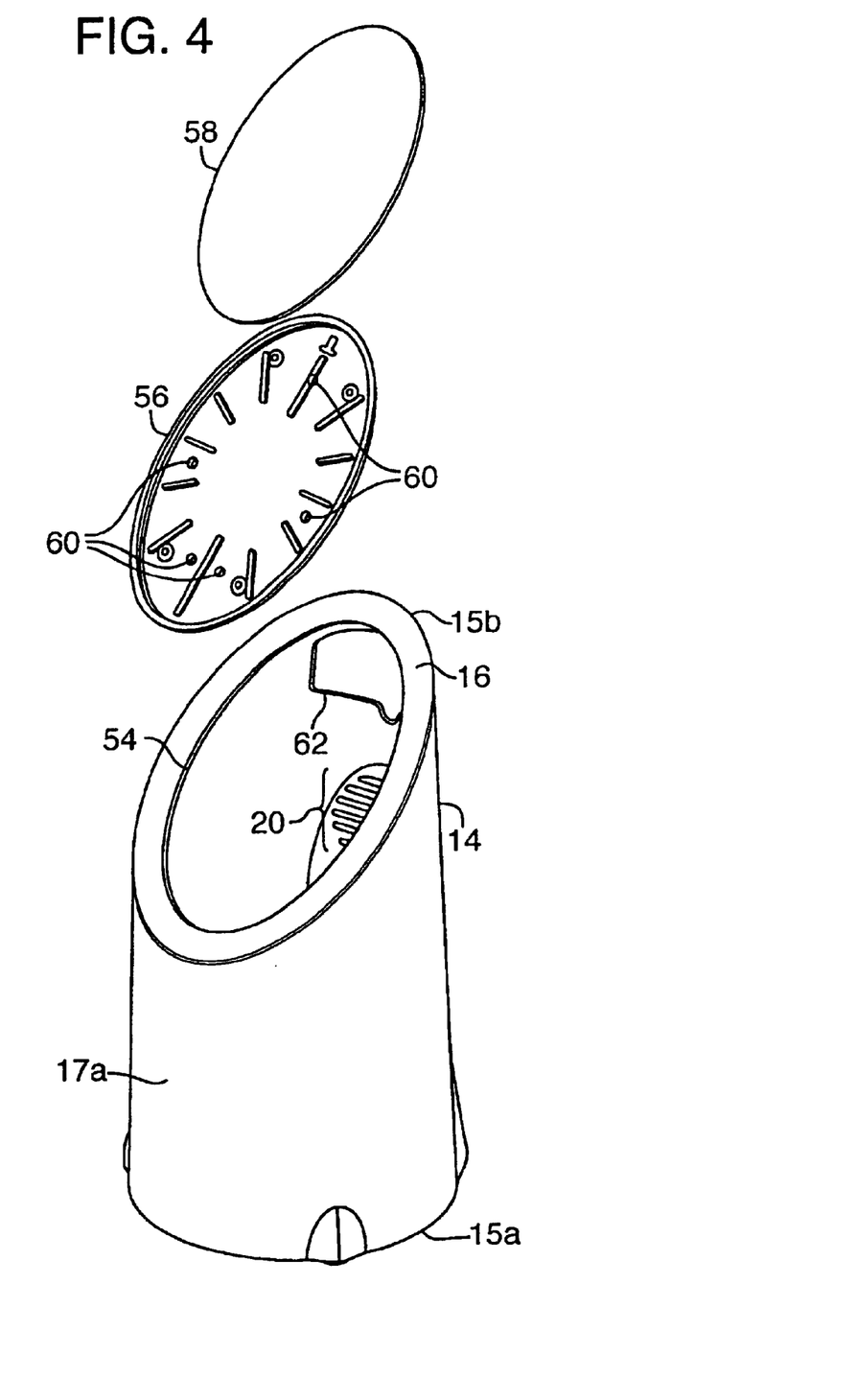
FIG. 4 is an exploded front perspective view of a housing of the air treatment unit of FIG. 1.

Referring to FIG. 4, a generally elliptical opening 54 is defined in the upper surface 16 of the housing 14. A lens 56, which is formed of a translucent polycarbonate material, is fitted with a slightly smaller opaque lens center 58 and received within the opening 54. The lens 56 has apertures 60 extending through to the interior 18 of the housing 14. Air can exit the interior 18, pass through the apertures 60, and exit the housing 14 via the gap 26 between the lens 56 and the lens center 58. As an added feature, if the lens 56 is formed of a translucent or transparent material, the lens 56 may be lit by the bulb 90 during operation of the unit 10 and appear as an elliptical ring.

An opening 62 sized for the tray end 52 is defined in the housing 14 above the air inlet portion 20. The opening 62 allows the photo-ionization assembly to be slidably removed from or inserted into the unit 10 (e.g., to inspect and/or replace the bulb 90) without disassembling the housing 14 and the base 12, which requires more time and effort, and may expose other components to potential damage.

Electrical Circuit

The air treatment unit 10 is designed to operate on normal household 110 V power supplied through a power cord 80. A power switch 82 allowing the unit to be turned "ON" or "OFF" is positioned in a recess 84 on the rear side 17b of the housing 14.

The air treatment unit 10 operates at a substantially constant voltage. Power is supplied to the fan 28, and a ballast 88 (connected to the fluorescent bulb 90) via conventional wiring, which has been omitted for clarity. Power is also supplied to a power supply 86, shown in FIG. 5, which supplies power to the negative ion generator 32.

The electrical connection from the power supply 86 to the negative ion generator 32 is a single lead from the negative side of the power supply extending through the outer surface 30 to the inner surface 59, which supplies about 20,000 volts at 20 kHz to create the negative charge on the conductive inner surface 59 and eliminate the bound charges on the surrounding dielectrics. The supplied power is sufficient to provide a negative charge equivalent of at least 10,000 volts.

The electrical connection between the power supply 86 and negative ion generator 32 is also self-limiting in that as the electrostatic field adjacent the negative ion generator 32 decreases from a positive value to zero, less power will be supplied so that fewer electrons will be generated. Thus, the self-limiting aspect of the power supply 86 prevents a high negatively charged environment from developing, which would tend to keep particles suspended, rather than allowing them to settle as desired.

In one specific implementation, the power supply 86 includes a feedback loop with a limiting output resistor such that the voltage supplied to the negative ion generator decreases as the electrostatic field decreases from a positive value to zero.

The ballast 88, which is connected to the fluorescent bulb 90, limits the current supplied to the bulb 90 and provides an inductive "kick" to initiate ionization of the bulb 90.

In a specific implementation, suitable electrical components are as follows:
Power supply 86: Collmer Semiconductor Series 2073 with custom features
Fan 28: Pelonis Model No. PM8025-7 AC Series Fan (80 mm sq.×25 mm)
Ballast 88: Robertson Transformer (now Robertson Worldwide) Catalog No. SSGPH287 P magnetic ballast
Bulb 90: Light Sources Inc. No. GPH 118T5VH/4 single-ended 4-pin germicidal bulb.

Operation

In photo-ionization, ultraviolet light at a wavelength of 185 nm striking oxygen in air will create ozone. The flow rate of the air past the bulb 90, as well as the wavelength and intensity of the light, can be varied to produce ozone at a desired rate. In some implementations, a germicidal light source is used, in which case the bulb 90 emits ultraviolet light at a wavelength effective to kill microorganisms (254 nm), as well as at 185 nm.

Although ozone is an effective oxidizer, other approaches to reducing airborne VOCs produce even better results. In photocatalytic oxidation, VOCs that have been adsorbed from air onto a catalyst surface in the air flow are oxidized by peroxide radicals and super-oxide ions. These peroxide radicals and super-oxide ions may be created by causing ultraviolet light to strike a target material. Photocatalytic oxidation is desirable because VOCs are significantly reduced, rather than being simply captured (e.g., by filtering), which requires their subsequent removal.

Photocatalytic oxidation may be combined with ozonation suck that light from the same light source produces ozone as well as the peroxide radicals and super-oxide ions. Photocatalytic methods and apparatus are disclosed in U.S. patent application Ser. No. 09/614/648, which was filed on Jul. 12, 2000 under the title "Air Treatment Apparatus" and names Ronald G. Fink as the inventor, and which is incorporated herein by reference.

In the air treatment unit 10, the inner surface 51 of the inner tray 52 can be coated or painted with a target material containing at least 10% titanium dioxide by weight. In specific implementations, the target material may also be formulated as 10–30% titanium dioxide, 0–30% silver and 0–30% copper, by weight. Periodic reapplication of the coating may be required.

As can be seen from FIGS. 5 and 6, the inner surface 51 is shaped and positioned such that it is directly opposite the lighting surface 92 of the bulb 90 over substantially its entire length and over more than half of its circumference. Specifically, the inner surface 51 is positioned such that it is opposite a first circumferential portion 97a of approximately 210°, with an adjoining second portion 97b being defined as the remaining approximately 150°0. Ultraviolet light emitted in straight rays (i.e., radially) from the first portion 97a is directed toward the inner surface 51, and the portion thereof that reaches the inner surface 51 causes the target material to produce peroxide radicals and super-oxide ions. Ultraviolet light emitted through the second portion 97b normally does not impinge upon the inner surface 51 (and thus does not impinge upon the target material), and therefore this portion of light may generate only ozone but not the peroxide radicals and super-oxide ions.

It can be seen that varying the proportion of ultraviolet light that strikes the target material relative to the portion that does not strike the target material allows regulation of the production of ozone. For example, referring to the implementation of the inner tray 50 with the coil 95 as shown in FIGS. 7A, 7B and 7C, the target material can be provided on the surface of the coil 95, in which case the target material is closer to the ultraviolet light source (i.e., the bulb 90), more target material is impinged upon by the ultraviolet light, and, correspondingly, less volumetric flow of oxygen is impinged upon by the UV light and more peroxide radicals and super-oxide ions are produced. Ultraviolet light passing through the spaces between rings of the coil 95 and not striking the target material still produces only ozone.

It should be noted that with a coated coil in place, there is no non-impingement portion 97b that can be defined, because at least some light rays from all angles will strike portions of the coil 95.

Although the coil 95 as shown in FIGS. 7A, 7B and 7C is comprised of about 10 turns or rings that would encircle the bulb 90, the spacing between the rings can be reduced by adding more turns or rings and thus increasing target material surface area that is impinged upon by the ultraviolet light to produce more peroxide radicals and super-oxide ions. Correspondingly, increased spacing, i.e., fewer rings, would produce fewer peroxide radicals and super-oxide ions.

As would be appreciated by those of skill in the art, structures similar to the coil configuration, such as a mesh, a screen or a perforated tube may be used, with the construction and sizing being determined according to the desired relative amounts of ozone and peroxide radicals/super-oxide ions, based upon the relative area through which ultraviolet light passes unimpeded (for producing ozone) and the area coated with target material (for producing peroxide radicals and super-oxide ions).

Materials

Except as specifically noted, the various components may be made of any suitable material. In a specific implementation, the housing 14, support member 42, outer tray 48, inner tray 50 and tray end 54 are all made of a plastic, e.g., polycarbonate or UV stabilized ABS.

It is to be understood that the present invention includes all such modifications as may come within the scope and spirit of the following claims and equivalents thereof.

What is claimed is:

1. A multi-function air treatment apparatus, comprising:
   a generally enclosed housing in which an interior and a plurality of through openings are defined, at least one of the through openings being an air inlet through which air enters the housing and at least one of the through openings being an air outlet through which air exits the housing;
   a negative ion generator positioned within the housing, the negative ion generator having an enclosed charged surface and an opposite outer surface on which negative ions are generated and from which the negative ions are transferred to the air via a negative electrostatic field; and
   a photo-ionizing assembly positioned within the housing, the photo-ionizing assembly having a light source that produces light at a desired wavelength to react with airborne matter,
   wherein negative ions generated by the negative ion generator interact with and neutralize positively charged airborne particles and the light from the photo-ionizing assembly causes oxidation of at least some of the airborne matter in adjacent air within the housing.

2. The apparatus of claim 1, wherein the photo-ionizing assembly produces ozone when light from the light source strikes oxygen in the air.

3. The apparatus of claim 2, wherein the photo-ionizing assembly includes a target catalyst, and wherein some of the light produced by the light source that strikes the target catalyst produces at least one of peroxide radicals and super-oxide ions.

4. The apparatus of claim 1, further comprising a power supply connected to at least the negative ion generator, the power supply configured to be self-limiting such that power is supplied at a decreasing voltage as the electrostatic field decreases from a positive value to zero.

5. The apparatus of claim 1, wherein the enclosed charged surface is formed as a coating.

6. The apparatus of claim 1, wherein the light source produces ultraviolet light at a predetermined wavelength such that light from the light source striking oxygen in the air causes ozone to form.

7. The apparatus of claim 1, wherein a portion of the photo-ionizing assembly is coated with a target substance, and the light impinging on the target produces radicals and ions that react with and reduce volatile organic compounds.

8. The apparatus of claim 7, wherein the target substance comprises at least about 10% $TiO_2$ by weight.

9. The apparatus of claim 7, wherein the target substance comprises about 10–30% $TiO_2$, about 0–30% Ag and about 0–30% Cu, by weight.

10. The apparatus of claim 1, wherein the opposite exposed surface of the negative ion generator is substantially non-conducting.

11. The apparatus of claim 1, wherein a top surface of the housing includes a translucent portion, and wherein the light source is positioned within the interior such that light from the light source illuminates the translucent portion when the light source is lit.

12. The apparatus of claim 1, wherein the housing has a base, further comprising a fan positioned within the interior and a component mount having a central plate and three spaced-apart downwardly extending legs that are coupled to the base at respective positions radially outward of the negative ion generator, the component mount being positioned above and generally in alignment with the negative ion generator with the central plate being adjacent the top surface of the negative ion generator, the central plate having a support member to which the fan and photo-ionizing assembly are coupled.

13. The apparatus of claim 12, further comprising an electrical circuit that provides electrical power and includes a power switch, a power supply and a ballast wherein the power supply and ballast are coupled to the top plate.

14. The apparatus of claim 1, wherein the light source is a bulb having two opposing ends and a substantially cylindrical peripheral surface between the two ends, and the photo-ionizing assembly includes a tray having an inner surface with openings that receive and support the ends of the bulb such that a portion of the peripheral surface between the ends is spaced from the tray.

15. The apparatus of claim 1, wherein the light source is a bulb having a substantially cylindrical lighting surface and the photo-ionizing assembly includes a tray shaped to receive a portion of light rays emitted radially from the lighting surface.

16. The apparatus of claim 15, wherein the tray is positioned relative to the bulb such that the inner surface of the tray is radially opposite more than half of the lighting surface.

17. The apparatus of claim 15, wherein the tray is positioned relative to the bulb such that the inner surface of the tray is radially opposite the lighting surface over substantially an entire length of the lighting surface and more than 180° of a circumference of the lighting surface.

18. The apparatus of claim 1, wherein the photo-ionizing assembly includes a coil that surrounds a portion of the light source, and the coil is coated with a target substance such that light impinging on the target produces radicals and ions that react with and reduce volatile organic compounds.

19. The apparatus of claim 1, wherein the power supply is configured to be self-regulating such that the power supplied to the negative ion generator decreases as the electrostatic field decreases from a positive value to zero.

20. A multi-approach air treatment apparatus, comprising;
a photo-ionizing assembly that emits a predetermined wavelength of ultraviolet light, wherein a first portion of the emitted light produces ozone upon impingement with adjacent air and a second portion of emitted light impinges upon a target that produces radicals and ions that bond with and reduce a portion of volatile organic compounds within the air; and
a negative ion generator that produces negative ions by an electrical charge applied to an enclosed conductive inner surface, the negative ion generator having a substantially non-conductive outer surface on which the negative ions are formed and from which the negative ions are transferred to air,
wherein the photo-ionizing assembly and the negative ion generator are powered by a common power source.

21. A multi-approach air treatment apparatus, comprising;
a housing that defines an interior area;
a photo-ionizing assembly positioned within the housing that emits a predetermined wavelength of ultraviolet light, wherein a first portion of the emitted light produces ozone upon impingement with adjacent air and a second portion of emitted light impinges upon a target that produces radicals and ions that bond with and reduce a portion of volatile organic compounds within the air;
a negative ion generator positioned within the housing that produces negative ions by an electrical charge applied to an enclosed conductive inner surface, the negative ion generator having a substantially non-conductive outer surface on which the negative ions are formed and from which the negative ions are transferred to the air; and
an air moving device adapted to cause air movement through the housing.

22. The apparatus of claim 21, wherein power is supplied from a common source to power the photo-ionizing assembly, the negative ion generator and the air moving device.

* * * * *

UNITED STATES PATENT AND TRADEMARK OFFICE
CERTIFICATE OF CORRECTION

PATENT NO.    : 6,752,970 B2
DATED         : June 22, 2004
INVENTOR(S)   : Harold O. Schwartz et al.

It is certified that error appears in the above-identified patent and that said Letters Patent is hereby corrected as shown below:

<u>Column 5,</u>
Line 20, delete "09/614/648" and insert -- 09/614,648 --.
Line 39, delete "150°0" and insert -- 150° --.

Signed and Sealed this

Seventeenth Day of May, 2005

JON W. DUDAS
*Director of the United States Patent and Trademark Office*